(12) United States Patent
Kunc et al.

(10) Patent No.: US 9,760,822 B2
(45) Date of Patent: Sep. 12, 2017

(54) METHOD AND CIRCUIT OF AN ACTIVELY TRANSMITTING TAG

(71) Applicant: STMicroelectronics International N.V., Amsterdam (NL)

(72) Inventors: Vinko Kunc, Ljubljana (SI); Maksimiljan Stiglic, Maribor (SI); Kosta Kovacic, Orehova Vas (SI); Albin Pevec, Ljubljana (SI); Anton Stern, Preddvor (SI)

(73) Assignee: STMicroelectronics International N.V., Schiphol (NL)

( * ) Notice: Subject to any disclaimer, the term of this patent is extended or adjusted under 35 U.S.C. 154(b) by 92 days.

(21) Appl. No.: 14/761,291

(22) PCT Filed: Jan. 14, 2014

(86) PCT No.: PCT/EP2014/050599
§ 371 (c)(1),
(2) Date: Jul. 15, 2015

(87) PCT Pub. No.: WO2014/111379
PCT Pub. Date: Jul. 24, 2014

(65) Prior Publication Data
US 2015/0347892 A1  Dec. 3, 2015

(30) Foreign Application Priority Data

Jan. 15, 2013  (SI) .................................. 201300010

(51) Int. Cl.
*G06K 19/07* (2006.01)
*G06K 7/10* (2006.01)
*H04B 5/00* (2006.01)

(52) U.S. Cl.
CPC ..... *G06K 19/0726* (2013.01); *G06K 7/10297* (2013.01); *G06K 19/0705* (2013.01);
(Continued)

(58) Field of Classification Search
CPC ........... G06K 19/0726; G06K 7/10297; G06K 19/0705; G06K 19/0723; G06K 19/07;
(Continued)

(56) References Cited

U.S. PATENT DOCUMENTS

| 4,471,340 A | * | 9/1984 | Lewis | ..................... | H03M 1/60 341/118 |
| 6,510,229 B1 | * | 1/2003 | Geile | ..................... | G06F 17/14 348/723 |

(Continued)

FOREIGN PATENT DOCUMENTS

| EP | 1801741 A2 | 6/2007 |
| EP | 1801741 B1 | 7/2009 |
| EP | 2431925 A1 | 3/2012 |

OTHER PUBLICATIONS

ISO/IEC 14443-1 Part 1: Physical characteristics, Second Edition, Jun. 15, 2008, 12 pages, Reference No. ISO/IEC 14443-1:2008(E), Geneva, Switzerland.

(Continued)

*Primary Examiner* — George Bugg
*Assistant Examiner* — Thang Tran
(74) *Attorney, Agent, or Firm* — Slater Matsil, LLP

(57) ABSTRACT

An actively transmitting tag detects a shift of a phase of an antenna signal (as) with regard to a phase of a transmitted signal (ts) in time intervals with a length of one half-period of a subcarrier, in which time intervals it transmits high-frequency wave packets with their phase being inverted according to a communication protocol at the ends of said half-periods. Generation of said wave packets is controlled by said phase shift in a way that said phase shift retains its absolute value at transitions into subsequent half-periods. Synchronizing the tag's transmission to a received interrogator signal carried out even during tag's transmitting enables the tag to transmit according to protocol ISO 14443

(Continued)

B by inverting a phase at transitions between said half-periods. Said synchronizing is carried out although no time window without a tag transmitting exists within the transmitted data frame.

34 Claims, 2 Drawing Sheets

(52) U.S. Cl.
CPC ....... *G06K 19/0723* (2013.01); *H04B 5/0056* (2013.01); *H04B 5/0075* (2013.01)

(58) Field of Classification Search
CPC ...... G06K 7/10; H04B 5/0056; H04B 5/0075; H04B 5/00
USPC .......................... 340/10.1–10.6, 572.1–572.9
See application file for complete search history.

(56) References Cited

U.S. PATENT DOCUMENTS

| | | | | |
|---|---|---|---|---|
| 7,405,662 B2* | 7/2008 | Steinke | ................ | G06K 7/0008 340/572.1 |
| 7,604,178 B2* | 10/2009 | Stewart | ................ | G06K 7/0008 235/492 |
| 2003/0185128 A1* | 10/2003 | Shoji | .................... | G11B 7/0053 369/59.25 |
| 2009/0174592 A1* | 7/2009 | Muellner | ........... | G06K 19/0723 342/51 |
| 2011/0304459 A1* | 12/2011 | Kwon | ................ | G06K 7/10297 340/568.8 |
| 2012/0071089 A1* | 3/2012 | Charrat | .............. | G06K 19/0723 455/41.1 |
| 2013/0003712 A1* | 1/2013 | Kunc | ................... | H04B 5/0068 370/345 |

OTHER PUBLICATIONS

ISO/IEC FDIS 14443-2 Part 2: Radio frequencey power and signal interface, Second Edition, 2010, 32 pages, Reference No. ISO/IEC FDIS 14443-2:2010(E), Geneva, Switzerland.

ISO/IEC FDIS 14443-3 Part 3: Initialization and anticollision, Second Edition, 2009, 70 pages, Reference No. ISO-IEC FDIS 14443-3:2009(E), Geneva, Switzerland.

ISO/IEC FDIS 14443-4 Part 4: Transmission protocol, Second Edition, 2008, 46 pages, Reference No. ISO/IEC FDIS 14443-4:2008(E), Geneva, Switzerland.

FeliCa Card User's Manual, Version 2.0, No. M617-E02-00, Sony Corporation, Oct. 2012, pp. 1-93.

FeliCa Lite-S User's Manual, Version 1.2, No. M741-E01-20, Sony Corporation, Oct. 2012, pp. 1-103.

* cited by examiner

METHOD AND CIRCUIT OF AN ACTIVELY TRANSMITTING TAG

The invention is related to a method and a circuit of an actively transmitting tag intended for a communication with an interrogator.

BACKGROUND OF THE INVENTION

The method and the circuit of the actively transmitting tag is designed for high-frequency communication with an interrogator, whereat the tag's circuit observes a phase of a tag's antenna signal before the tag starts transmitting a data frame. The method and the circuit of the invention are intended for communication according to communication protocol ISO 14443 B with phase inversions at transitions between half-periods of a subcarrier in a transmitted signal as well as according to communication protocol ISO 14443 A with phase inversions at transitions between half-periods of a subcarrier in a transmitted signal in transmissions with bit rates of 212 kb/s, 424 kb/s or 848 kb/s, or according to other communication protocols (e.g. FELICA), in which the actively transmitting tag transmits long data frames, whereat the actively transmitting tag controls a phase of the transmitted signal by detecting a phase of the transmitted signal with regard to a phase of the current antenna signal.

A signal of an actively transmitting tag constructively interferes with an interrogator's transmitted signal at an interrogator antenna. Therefore said tag's signal is detected in a considerably stronger way than a signal transmitted by a passive tag of equal dimensions, which passive tag load-modulates the interrogator signal.

A tiny antenna of the actively transmitting tag manages to build-up a sufficiently strong signal at the interrogator antenna, which accelerates development of actively transmitting tags.

Said constructive interference at the interrogator antenna is accomplished by the actively transmitting tag, which matches a phase and a frequency of the transmitted signal with a received interrogator signal to the best possible extent.

Known technical solutions (Giesecke & Devrient GmbH, Inside Contactless S.A. and IDS d.o.o. together with Austriamicrosystems AG) attain said matching in various ways and have diverse levels of success in practical applications.

Patent EP 1801741 B1 (Giesecke & Devrient) discloses the technical solution, in which the actively transmitting tag matches its transmitted signal to a received interrogator signal in phase and frequency before it starts transmitting a data frame. The phase and the frequency are not corrected during transmitting the data frame, and as a result no reliable communication can be guaranteed.

According to the known technical solution as disclosed in patent EP 2431925 B1 (Inside Contactless S.A.), the phase and the frequency of the tag's transmitted signal are matched to the received interrogator signal before the tag starts transmitting, in fact before each transmitted burst. A packet of eight waves with a carrier frequency of 13.56 MHz represents said burst. In communication according to protocol ISO 14443 A or ISO 14443 B, the burst extends over one half-period of a subcarrier of the transmitted signal.

An actively transmitting tag as disclosed in patent application PCT/SI2012/000024 (IDS d.o.o. together with Austriamicrosystems AG) observes a phase of an interrogator's signal induced in a tag's antenna in such adequately selected time intervals and located even within a data frame being transmitted, in which time intervals, according to a communication protocol, the smart tag does not transmit packets of high-frequency radio waves, and after each such time interval has passed the actively transmitting tag starts transmitting a high-frequency wave packet by exciting its own antenna with the transmitted signal, a phase of which transmitted signal is always set, at the beginning of transmitting each said high-frequency wave packet, shifted with respect to said phase of the antenna signal by the same phase angle.

Said patent EP 1801741 B1 also suggests a way of communicating that the high-frequency wave packet is transmitted with a certain phase during the half-period of a subcarrier of the transmitted signal and in a next half-period with the inverted phase. An amplitude of the tag's signal at the interrogator antenna thus gets doubled and communication range is increased.

Voltage of a transmitted signal at an antenna of an actively transmitting tag is represented in FIG. 1 by a first and second windows for communication according to protocol ISO 14443 A and ISO 14443 B, and by a third and fourth windows for communication according to protocol ISO 14443 A and ISO 14443 B, in both cases by inverting a phase at transitions between half-periods of a subcarrier of the transmitted signal.

The method as disclosed in patent EP 2431925 B1 is not feasible when communicating by inverting a phase at transitions between half-periods of a subcarrier of the transmitted signal either according to protocol ISO 14443 A or according to protocol ISO 14443 B since the first burst is immediately and without a pause followed by a second burst and so on; a half-period of the subcarrier, in which a phase of the interrogator signal would be observed in order to phase-rematch a tag's generator of the transmitted signal, is here no longer available.

The method as disclosed by patent application PCT/SI2012/000024 can be applied in communicating by inverting a phase at transitions between half-periods of the transmitted signal subcarrier according to protocol ISO 14443 A because the actively transmitting tag does not transmit during a time interval with a length of one half of bit or of four periods of the subcarrier. Said method, in turn, cannot be applied when communicating by said inverting the phase according to protocol ISO 14443 B. In this communication protocol the actively transmitting tag uninterruptedly transmits and there is no time window available to match the phase and the frequency throughout the transmission of the complete data frame.

SUMMARY OF THE INVENTION

In an embodiment, matching of a phase and a frequency of a transmitted signal of an actively transmitting tag within each half-period of a subcarrier of said transmitted signal to a phase and a frequency of a received interrogator signal is carried out when communicating according to protocol ISO 14443 B by inverting a phase at transitions between the half-periods of the transmitted signal subcarrier as well as according to protocol ISO 14443 A with said phase inverting at higher transmission bit rates such as 212 kb/s, 424 kb/s or 848 kb/s or according to other protocols by said phase inverting (e.g. FELICA) whereat the actively transmitting tag transmits a long data frame.

In an embodiment, said matching is performed by a method intended for high-frequency communication between an interrogator and an actively transmitting tag and by a circuit for carrying out said method.

An embodiment proposes synchronizing a signal transmitted by the actively transmitting tag to a received interrogator signal during tag's transmission, which enables the actively transmitting tag to transmit a long data frame even according to protocol ISO 14443 B with phase inversions at transitions between half-periods of a transmitted signal subcarrier. The embodiment makes said synchronizing possible although the transmitted data frame is devoid of a time window without transmitting.

BRIEF DESCRIPTION OF THE DRAWINGS

The invention will now be explained in more detail by way of a description of embodiments of the method as well as the circuit intended for high-frequency communication of an actively transmitting tag with an interrogator as well as by way of drawings representing in FIG. 1 in a first to a fourth window, a voltage of a transmitted signal at an antenna of an actively transmiting tag.

DETAILED DESCRIPTION

Figure 2:
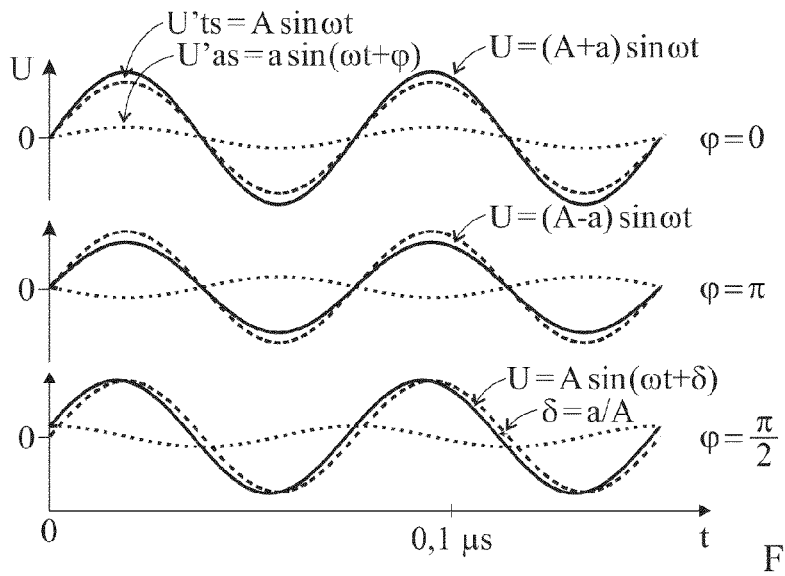
FIG. 2 in a first, second and third window, time development of a signal U'as on a tag's antenna the signal being induced by an interrogator's electromagnetic field in absence of a tag's transmitted signal U'ts, time development of the tag's transmitted signal U'ts on the tag's antenna in absence of the interrogator's induced signal and time development of a resulting signal U on the antenna of the actively transmitting tag located in the interrogator's electromagnetic field, specifically when a phase shift φ of the interrogator's induced signal with regard to a phase of the tag's transmitted signal equals 0, π and π/2, respectively.
Figure 4:
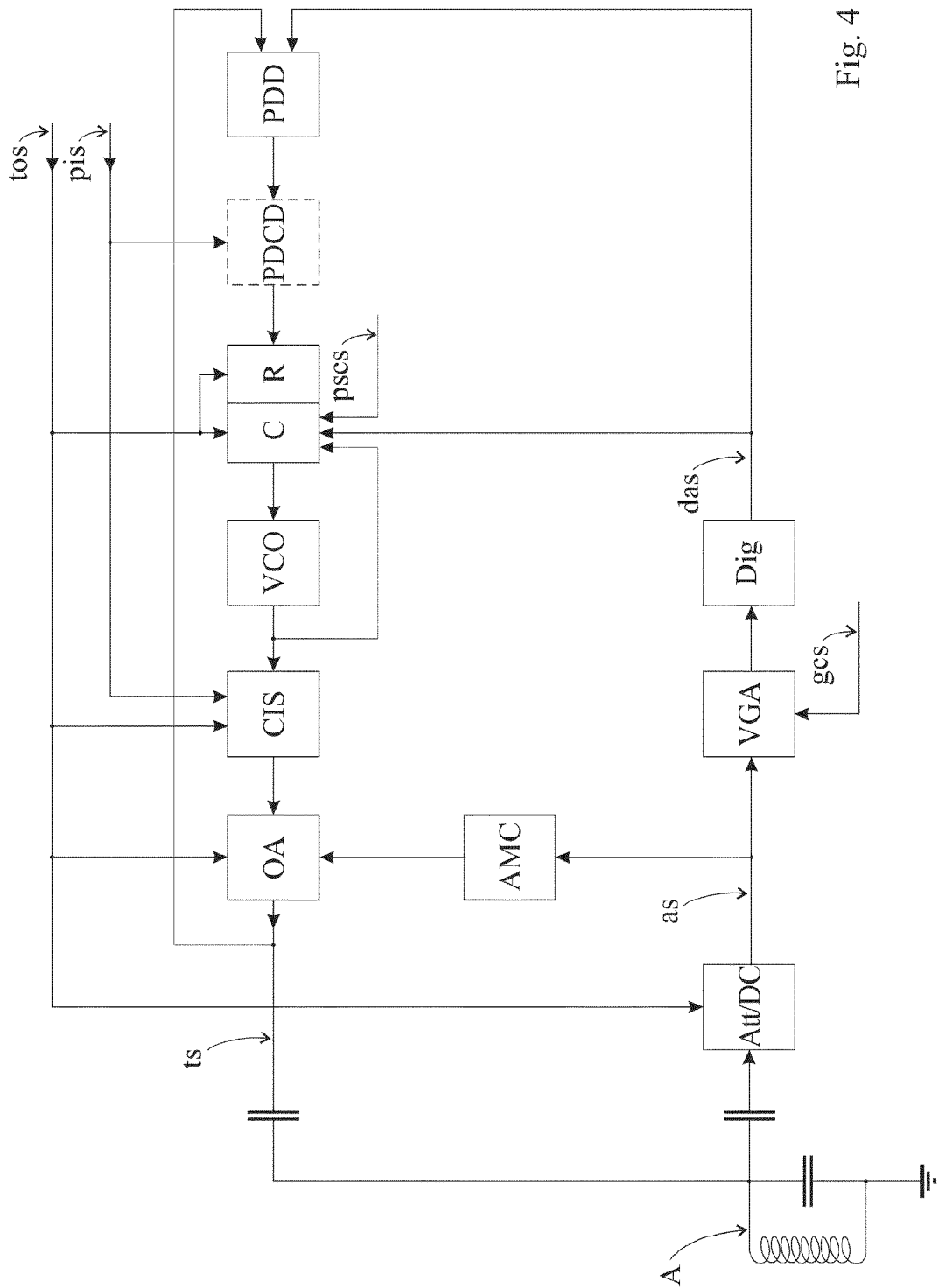
FIG. 4 a block diagram of a tag's circuit for high-frequency communication between the interrogator and the actively transmitting tag according to a protocol by phase inverting at transitions between half-periods of the transmitted signal subcarrier.

A ratio between an amplitude of a signal U'as on a tag's antenna A, said signal being induced by an interrogator's electromagnetic field in absence of a tag's transmitted signal U'ts, and an amplitude of said tag's transmitted signal U'ts on the tag's antenna A ranges from a value of several hundredths of a millivolt to several tenths of a millivolt to a value of several volts to several tens of volts (FIGS. 2 and 4).

Hence, the tag's transmitted signal ts overlaps the signal U'as as induced by the interrogator. They are exactly a phase and a frequency of the signal U'as as induced by the interrogator whereon a phase and a frequency of the tag's transmitted signal ts should be based in order for constructive interference to be achieved at an interrogator antenna between the signal as transmitted by the actively transmitting tag and the interrogator's own transmitted signal. It is said constructive interference, on which the efficiency of the actively transmitting tag is based.

Consideration of three cases of superposing two sine-wave signals as represented in FIG. 2 contributes to a solution of the technical problem, which is: how to carry out matching of a phase and a frequency of a transmitted signal of the actively transmitting tag within each half-period of a subcarrier of said transmitted signal with a phase and a frequency of a weak received interrogator signal—they are exactly the phase and the frequency of the weak interrogator signal whereon the phase and frequency of the tag's transmitted signal ts should be based—when communicating according to protocol ISO 14443 B with inverting a phase at transitions between half-periods of a subcarrier of the transmitted signal as well as according to protocol ISO 14443 A with said phase inverting in higher transmission bit rates such as 212 kb/s, 424 kb/s or 848 kb/s or according to other protocols with said phase inverting (e.g. FELICA), in which the actively transmitting tag transmits a long data frame.

It should be taken into consideration that the actively transmitting tag either transmits during all half-periods of a subcarrier or at least during a half of them, therefore the weak interrogator signal is overlapped by the tag's transmitted signal all the time or at least a considerable part of time.

The signal U'as (dash-dotted) as induced in the tag's antenna by the interrogator's electromagnetic field when the tag's transmitted signal U'ts (dashed) is absent (prime) is superposed in the tag's antenna on said tag's transmitted signal U'ts during tag's transmission. The tag's transmitted signal U'ts has a time development U'ts=A sin(ωt), when the induced interrogator signal is absent (prime). Said signal U'as has a time development U'as=a sin(ωt+φ), wherein a<<A and φ is a phase shift of the induced signal with regard to said tag's transmitted signal U'ts.

When the tag receives the interrogator signal and transmits at the same time, a resulting signal U (uninterrupted line) at the tag's antenna is not phase shifted (δ=0) with regard to the tag's transmitted signal U'ts and the amplitude A is only changed at the phase shifts φ=0 and φ=π (first and second window, respectively): U=(A±a) sin(ωt), whereas the resulting signal U is phase shifted by δ=±a/A with regard to the tag's transmitted signal U'ts and the amplitude does not change at the phase shift φ=±π/2 (third window): U=A sin(ωt+δ).

Accordingly, the phase shift δ is a measure of the phase shift φ.

Figure 3:
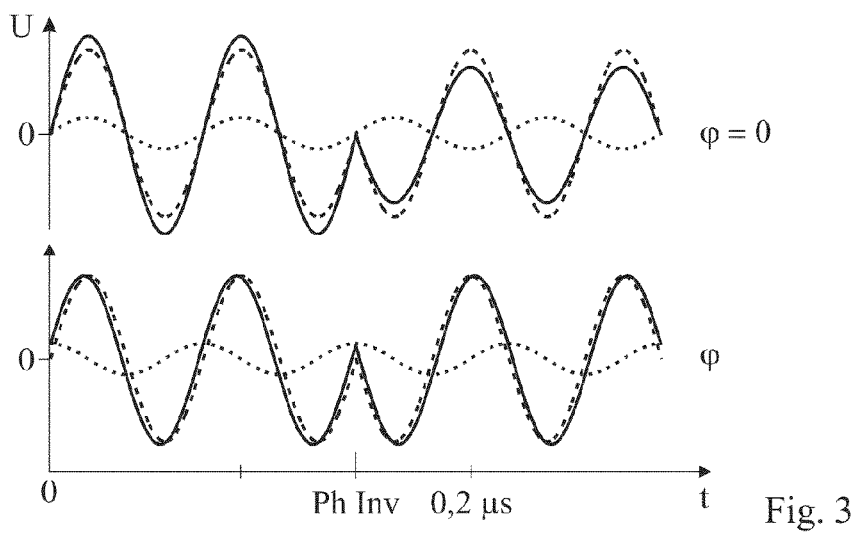
FIG. 3 in a first and second window, time development of the same three signals close to a time moment PhInv of phase inverting when said phase shift φ equals 0 and when phase shift φ is not close to 0 or π, respectively.

A time development of said three signals in the proximity of a point PhInv denoting said phase inversion is represented in FIG. 3 for said phase shift φ equaling 0 and said phase shift φ differing from 0. The phase shift δ of the resulting signal U with regard to the tag's transmitted signal U'ts and even more its doubled value as obtained by building a difference of said phase shifts φ before and after the inverting point PhInv can be chosen as a quantity, whereon a regulating can be based when generating the transmitted signal ts for communicating according to communication protocol ISO 14443 B with phase inversions at transitions between half-periods of the subcarrier in the transmitted signal as well as according to communication protocol ISO 14443 A with the phase inversions at transitions between half-periods of the subcarrier in the transmitted signal for the transmission with higher bit rates of 212 kb/s, 424 kb/s or 848 kb/s, or according to other communication protocols (e.g. FELICA), at which the actively transmitting tag transmits with said phase inversions.

A method for high-frequency communication between an interrogator and an actively transmitting tag starts to be carried out by any known method, e.g. a method as disclosed in patent application PCT/SI2012/000024 for matching the phase of the tag's transmitted signal ts to the interrogator signal at the beginning of the transmission when the actively transmitting tag starts transmitting.

Before the actively transmitting tag situated in an interrogator's radiation field starts transmitting a data frame, it first observes a phase of an antenna signal as being a signal as induced by the interrogator at that time (FIG. 4). At this time, the actively transmitting tag does not yet generate a sequence of high-frequency wave packets for the transmitted signal ts.

The actively transmitting tag then starts generating and transmitting the data frame in the form of a sequence of high-frequency wave packets by exciting its own antenna A with said transmitted signal ts, which is synchronous with the antenna signal as as present up to that time, namely the transmitted signal ts has the same frequency and a constant desired phase shift with regard to said antenna signal as.

At the beginning of the transmission, the phase of the transmitted signal ts is set shifted by a chosen first phase shift with regard to the phase of said antenna signal as present up to that time. A value of said first shift is optionally set to zero. The transmitted signal ts is conducted to the tag antenna A through a matching circuit.

According to an embodiment, the actively transmitting tag transmits the data frame in a way that it transmits high-frequency wave packets with a length of one half-period of a subcarrier of the transmitted signal ts and a phase being inverted according to communication protocol each time at the end of the subcarrier half-period.

In time intervals with the length of one subcarrier half-period during the data frame transmission, the actively transmitting tag detects a shift of the phase of the antenna signal as with regard to the phase of the transmitted signal is as a second phase shift.

According to an embodiment, the actively transmitting tag controls generating the high-frequency wave packet each time after transition into a subsequent half-period of the subcarrier according to said second shift in phase as detected in a previous subcarrier half-period.

On the one hand, the actively transmitting tag controls generating the high-frequency wave packets in a way that said second shift in phase retains a constant absolute value at the transitions into the subsequent subcarrier half-period. Optionally, said second shift in phase remains zero at said transitions.

On the other hand, the actively transmitting tag may calculate a difference between said second shift in phase for the current half-period of the subcarrier and said second shift in phase for the previous subcarrier half-period. The generation of the high-frequency wave packets is now controlled in a way that the difference between said second shifts in phase retains a constant absolute value at the transitions into the subsequent subcarrier half-period. Optionally, said difference between said second shifts in phase should remain zero.

Any communication protocol, according to which the phase is inverted at the transitions between the subcarrier half-periods, can be used for carrying out the method of an aspect of the invention.

Figure 1:
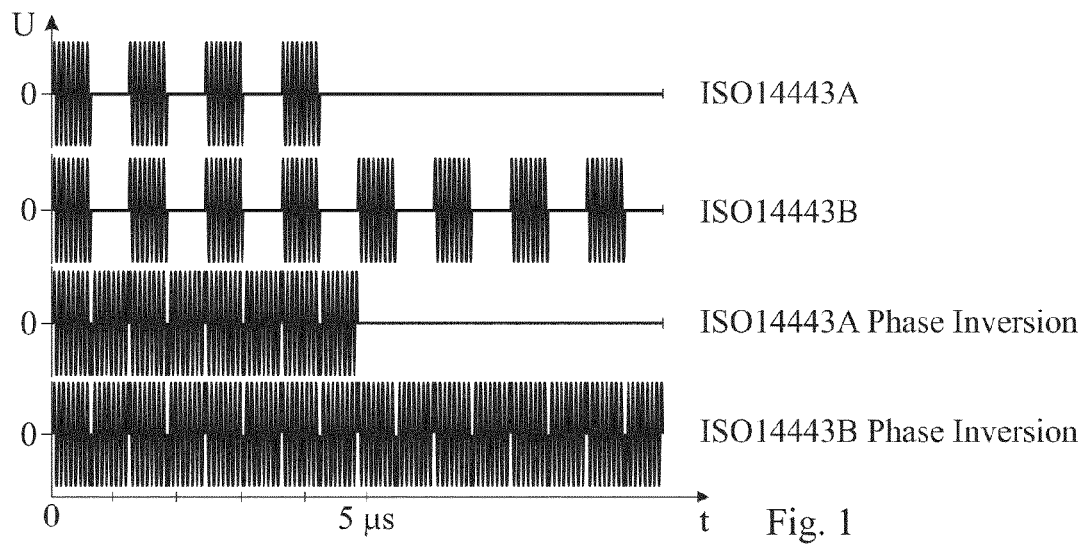

Communication protocol ISO 14443 B, according to which the phase is inverted at the transitions between the subcarrier half-periods, is such protocol (FIG. 1 window 4). During data frame transmission according to this communication protocol, the actively transmitting tag has no time window without transmitting at its disposal and, during which time window it would be able to detect said first phase shift as according to the state of the art.

Communication protocol ISO 14443 A with phase inversions at the transitions between the subcarrier half-periods and for the transmission with bit rates of 212 kb/s, 424 kb/s or 848 kb/s or protocol FELICA are also suited as protocols for carrying out the method of an aspect of the invention.

A circuit for high-frequency communication of an actively transmitting tag with an interrogator may also be based on a known circuit as disclosed in patent application PCT/SI2012/000024.

In this known circuit, an antenna signal as from a tag antenna A is conducted into a digitizer Dig through an attenuating and DC voltage defining circuit Att/DC as well as a variable gain amplifier VGA. Said gain is adjusted by a control signal gcs.

A digitized antenna signal das from an output of the digitizer Dig is conducted to an input of a phase-frequency comparator C, which observes a phase of said antenna signal as due to an interrogator's radiation field, already before the actively transmitting tag starts transmitting a data frame. The phase-frequency comparator C is controlled by a phase-shift control signal pscs setting a first phase shift.

The phase-frequency comparator C controls a voltage-controlled oscillator VCO in a way to start generating a transmitted signal ts. At the beginning of a data frame transmission it is shifted with regard to the antenna signal as by said observed first phase shift.

The transmitted signal ts is conducted through an output amplifier OA and a matching circuit to the antenna A in the form of a sequence of high-frequency wave packets.

Both, the output amplifier OA and the attenuating and DC voltage defining circuit Att/DC are controlled by means of a transmit-on signal tos defining a start and an end of the tag's transmitting. Before starting the transmission of the data frame a gain of the output amplifier OA is set with regard to intensity of the antenna signal as as measured by an amplitude measuring circuit AMC.

The actively transmitting tag transmits the data frame in a way that it generates and transmits the high-frequency wave packets each with a length of one subcarrier half-period of the transmitted signal ts, a phase of said wave packets being inverted according to a communication protocol each time at the end of the subcarrier half-period.

Said communication protocol can be any communication protocol, according to which the phase is inverted at the transitions between the subcarrier half-periods.

According an embodiment, the output of the digitizer Dig and an output of the output amplifier OA are connected to input terminals of a phase-displacement detector PDD, which may be a mixing circuit. During the transmission of the actively transmitting tag in time intervals with the length of one subcarrier half-period, the phase-displacement detector PDD detects a shift of the phase of the antenna signal as with regard to a phase of the transmitted signal ts and generates a signal of a second phase shift.

The signal of the second phase shift from an output of the phase-displacement detector PDD is conducted to a regulator circuit R that controls the voltage-controlled oscillator VCO during transmission of the data frame in a way to generate the high-frequency wave packets according to said detected second phase shift.

The high-frequency wave packets from an output of the voltage-controlled oscillator VCO are conducted through an inverter stage CIS controlled by a phase-inverting signal pis. The phase of the transmitted signal ts is inverted according to a communication protocol.

On the one hand, said controlling the voltage-controlled oscillator VCO may be carried out in a way that said second phase shift retains a constant absolute value each time at the transitions into the subsequent subcarrier half-period. Optionally, said second phase shift remains zero.

On the other hand, said control may be carried out in the following way:

The second-phase-shift signal from the output of the phase-displacement detector PDD is conducted to an input of a controlled circuit PDCD for determining a change in the second phase shift. Said circuit is controlled by said phase-inverting signal pis and calculates a difference between said second phase shift for the current subcarrier half-period and said second phase shift for the previous half-period of the subcarrier.

An output of the controlled circuit PDCD for the determination of the change in the second phase shift is connected to said regulator circuit R. The regulator circuit R controls the voltage-controlled oscillator VCO in a way that said change in the second phase shift retains a constant absolute value at the transitions into the subsequent subcarrier half-period and optionally remains zero.

The invention claimed is:

1. A method for high-frequency communication between an interrogator and an actively transmitting tag, which, before it starts transmitting a data frame, first observes a phase of an antenna signal due to an interrogator's radiation field and then starts transmitting the data frame in the form of a sequence of high-frequency bursts by exciting, through a matching circuit, its own antenna with a transmitted signal initially having said observed phase of the antenna signal, wherein the actively transmitting tag transmits the data frame by transmitting the high-frequency bursts, each of them having a length of one subcarrier half-period of the transmitted signal and their phase being inverted according to a communication protocol each time at the end of the subcarrier half-period, wherein, in time intervals with the length of one subcarrier half-period during transmitting the data frame, the actively transmitting tag detects a shift of the phase of the antenna signal with regard to a phase of the transmitted signal, and wherein each time after transition into a subsequent subcarrier half-period, the actively transmitting tag controls generating the high-frequency burst according to said detected shift of the phase.

2. The method as recited in claim 1, wherein the actively transmitting tag controls generation of high-frequency bursts in a way that said shift of the phase retains a constant absolute value at the transitions into the subsequent subcarrier half-periods.

3. The method as recited in claim 2, wherein said shift of the phase remains zero at the transitions into the subsequent subcarrier half-periods.

4. The method as recited in claim 1, wherein the actively transmitting tag calculates a difference between said shift of the phase for the current subcarrier half-period and said shift of the phase for the previous subcarrier half-period and wherein the actively transmitting tag controls generation of high-frequency bursts in a way that the difference between said shifts of the phase retains a constant absolute value at the transitions into the subsequent subcarrier half-periods.

5. The method as recited in claim 4, wherein said difference between said shifts of the phase remains zero at the transitions into the subsequent subcarrier half-periods.

6. The method according to claim 1, wherein said communication protocol is any communication protocol, according to which the phase is inverted at the transitions between the subcarrier half-periods.

7. The method as recited in claim 6, wherein said communication protocol is a communication protocol ISO 14443 B, according to which the phase is inverted at the transitions between the subcarrier half-periods.

8. The method as recited in claim 6, wherein said communication protocol is a communication protocol ISO 14443 A, according to which the phase is inverted at the transitions between the subcarrier half-periods and bit rates for the transmission are 212 kb/s, 424 kb/s or 848 kb/s.

9. A circuit for high-frequency communication between an interrogator and an actively transmitting tag, whose antenna signal (as) is conducted from an antenna into a digitizer, whose output is connected to an input of a phase-frequency comparator, which, before the actively transmitting tag starts transmitting a data frame, first observes a phase of the antenna signal due to an interrogator's radiation field in order that the actively transmitting tag starts transmitting the data frame in the form of a sequence of high-frequency bursts in a way that a voltage-controlled oscillator starts generating a transmitted signal initially having said observed phase of the antenna signal and in the form of said high-frequency bursts being conducted to the antenna through an output amplifier and a matching circuit, wherein the actively transmitting tag transmits the data frame by transmitting the high-frequency bursts each of them having a length of one subcarrier half-period of the transmitted signal and their phase being always inverted according to a communication protocol at the end of the subcarrier half-period, wherein an output of the digitizer and an output of the output amplifier are connected to input terminals of a phase-displacement detector, which, in time intervals with said length of one subcarrier half-period, detects a shift of the phase of the antenna signal with regard to a phase of the transmitted signal, and wherein a phase-displacement signal from an output of the phase-displacement detector is conducted to a regulator circuit, which, while the high-frequency bursts are transmitted, controls the voltage-controlled oscillator in order to generate the high-frequency bursts according to said detected shift of the phase.

10. The circuit as recited in claim 9, wherein a phase-inverting signal controls a controlled inverter stage in a way to invert the phase of the transmitted signal according to a communication protocol.

11. The circuit as recited in claim 9, wherein the phase-displacement detector is a mixing circuit.

12. The circuit according to claim 9, wherein the regulator circuit controls the voltage-controlled oscillator in a way that said shift of the phase retains a constant absolute value at the transitions into the subsequent subcarrier half-periods.

13. The circuit according to claim 9, wherein said shift of the phase remains zero at the transitions into the subsequent subcarrier half-periods.

14. The circuit according to claim 9, wherein the phase-displacement signal from the output of the phase-displacement detector is conducted to an input of a controlled circuit for a phase-displacement change determination, which circuit is controlled by said phase-inverting signal and calculates a difference between said shift of the phase for the current subcarrier half-period and said shift of the phase for the previous subcarrier half-period, and wherein an output of the controlled circuit for the phase shift change determination is connected to the regulator circuit, which controls the voltage-controlled oscillator in a way that the difference between said shifts of the phase retains a constant absolute value each time at the transitions into the subsequent subcarrier half-periods.

15. The circuit as recited in claim 14, wherein said difference between said shifts of the phase remains zero at the transitions into the subsequent subcarrier half-periods.

16. The circuit according to claim 9, wherein said communication protocol can be any communication protocol, according to which the phase is inverted at the transitions between the subcarrier half-periods.

17. A method for high-frequency communication between an interrogator and an actively transmitting tag, the method comprising: determining, by the actively transmitting tag and prior to transmitting a data frame, a phase of an antenna signal due to a radiation field of the interrogator; exciting, through a matching circuit, an antenna of the actively transmitting tag with a transmitted signal, wherein the transmitted signal initially has a phase equal to the phase of the antenna signal; generating, by the actively transmitting tag, a sequence of high-frequency bursts corresponding with the data frame; transmitting, by the actively transmitting tag, the sequence of high-frequency bursts, wherein each high-frequency burst has a length of one subcarrier half-period of the transmitted signal and a phase inverted according to a communication protocol at an end of each subcarrier half-period; detecting, by the actively transmitting tag and during the transmitting of the data frame, a shift of the phase of the antenna signal relative to a phase of the transmitted signal in time intervals with a length of one subcarrier half-period; and controlling, by the actively transmitting tag, the generating of the sequence of high-frequency bursts according to the shift of the phase of the antenna signal after each transition into a subsequent subcarrier half-period.

18. The method according to claim 17, wherein controlling the generation of the sequence of high-frequency bursts comprises retaining a constant absolute value with respect to the shift of the phase of the antenna signal at the transitions into the subsequent subcarrier half-periods.

19. The method according to claim 18, wherein the shift of the phase of the antenna signal remains zero at the transitions into the subsequent subcarrier half-periods.

20. The method according to claim 17, further comprising: calculating, by the actively transmitting tag, a difference between a shift of the phase of the antenna signal for a current subcarrier half-period and a shift of the phase of the antenna signal for a previous subcarrier half-period; and controlling, by the actively transmitting tag, the generation of the sequence of high-frequency bursts to retain a constant absolute value with respect to the difference between the shifts of the phase of the antenna signal at the transitions into the subsequent subcarrier half-periods.

21. The method according to claim 20, wherein the difference between the shifts of the phase of the antenna signal remains zero at transitions into subsequent subcarrier half-periods.

22. The method according to claim 17, wherein the communication protocol is any communication protocol, according to which the phase is inverted at the transitions between the subcarrier half-periods.

23. The method according to claim 22, wherein the communication protocol is a communication protocol ISO 14443 B, according to which the phase is inverted at the transitions between the subcarrier half-periods.

24. The method according to claim 22, wherein the communication protocol is a communication protocol ISO 14443 A, according to which the phase is inverted at the transitions between the subcarrier half-periods and bit rates for the transmission are 212 kb/s, 424 kb/s or 848 kb/s.

25. A circuit for high-frequency communication between an interrogator and an actively transmitting tag, the circuit comprising: an antenna configured to receive an antenna signal; a digitizer comprising an input coupled to the antenna; a phase-frequency comparator configured to determine a phase of the antenna signal due to a radiation field of the interrogator prior to transmitting a data frame, wherein an input of the phase-frequency comparator is connected to an output of the digitizer; a voltage-controlled oscillator (VCO) configured to generate a transmitted signal that initially has a phase equal to the phase of the antenna signal, wherein the transmitted signal is a sequence of high-frequency bursts corresponding with the data frame, and wherein each high-frequency burst has a length of one subcarrier half-period of the transmitted signal and a phase that is inverted according to a communication protocol at an end of each subcarrier half-period; an output amplifier and a matching circuit configured to conduct the transmitted signal to the antenna; a phase-displacement detector configured, in time intervals with the length of one subcarrier half-period, to detect a shift of the phase of the antenna signal relative to a phase of the transmitted signal, and wherein an output of the digitizer and an output of the output amplifier are connected to input terminals of the phase-displacement detector; and a regulator configured, during the transmission of the sequence of high-frequency bursts, to control the VCO to generate the sequence of high-frequency bursts according to the shift of the phase of the antenna signal, wherein an output of the phase-displacement detector is conducted to an input of the regulator.

26. The circuit according to claim 25, further comprising a controlled inverter stage configured to invert the phase of the transmitted signal according to the communication protocol, wherein the controller inverter stage is controlled by a phase-inverting signal.

27. The circuit according to claim 25, wherein the phase-displacement detector is a mixing circuit.

28. The circuit according to claim 25, wherein the regulator is configured to control the VCO, at transitions into subsequent subcarrier half-periods, to retain a constant absolute value with respect to the shift of the phase of the antenna signal.

29. The circuit according to claim 25, wherein the regulator is configured to control the VCO, at transitions into subsequent subcarrier half-periods, to attain a zero phase shift with respect to the shift of the phase of the antenna signal.

30. The circuit according to claim 25, further comprising a control circuit, wherein an input of the control circuit is connected to the output of the phase-displacement detector, and wherein the control circuit is configured to calculate a difference between a shift of the phase of the antenna signal for a current subcarrier half-period and a shift of the phase of the antenna signal for a previous sub-carrier.

31. The circuit according to claim 30, wherein the control circuit is controlled by a phase-displacement signal from the output of the phase-displacement detector.

32. The circuit according to claim 30, wherein the regulator further comprises an input connected to an output of the control circuit, and wherein the regulator is configured to control the VCO, at each transition into subsequent subcarrier half-periods, to retain a constant absolute value with respect to the difference between the shift of the phase of the antenna signal for the current subcarrier half-period and the shift of the phase of the antenna signal for the previous sub-carrier.

33. The circuit according to claim 30, wherein the difference between the shift of the phase of the antenna signal for the current subcarrier half-period and the shift of the phase of the antenna signal for the previous sub-carrier remains zero at the transitions into subsequent subcarrier half-periods.

34. The circuit according to claim 25, wherein the regulator is configured to control the VCO to have any communication protocol, according to which the phase is inverted at transitions between the subcarrier half-periods.

* * * * *